United States Patent Office 3,331,853
Patented July 18, 1967

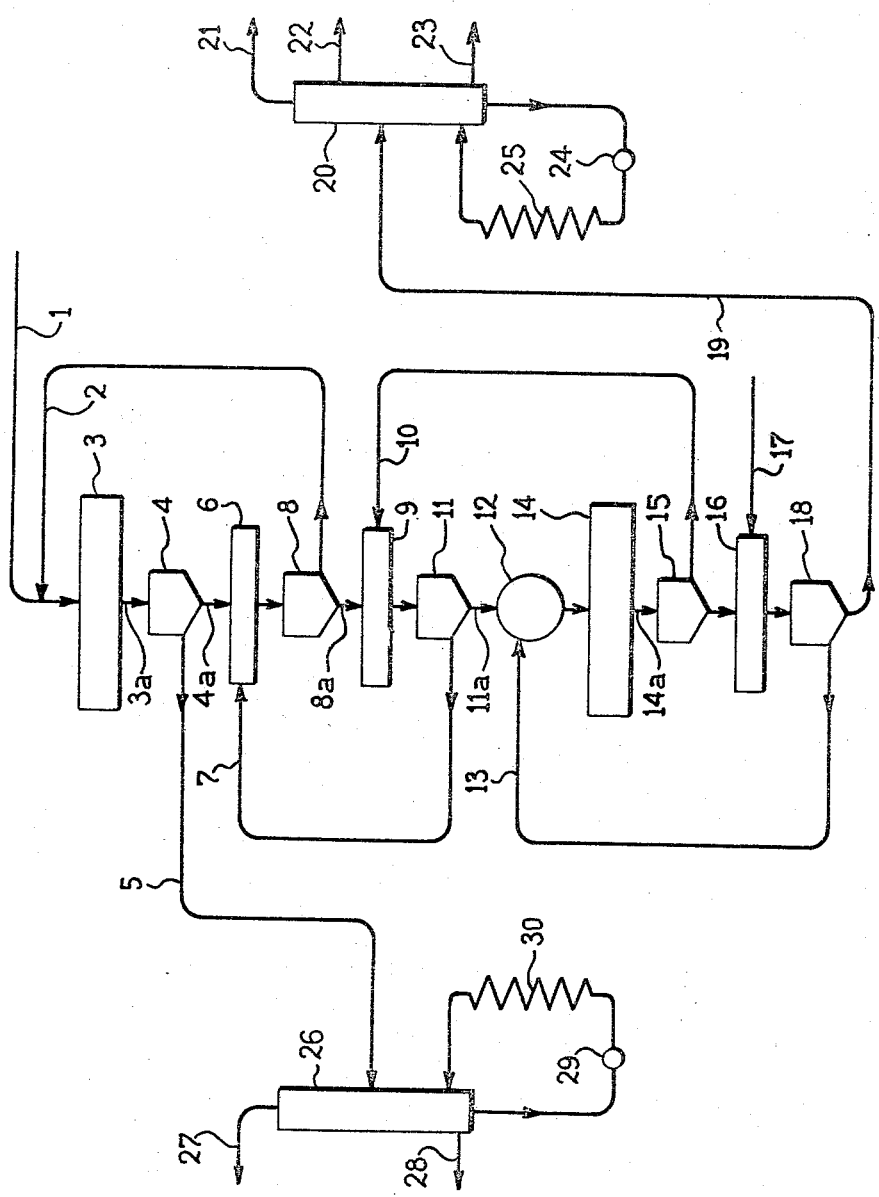

3,331,853
PROCESS FOR EXTRACTING ANTHRACENE AND CARBAZOL FROM CRUDE ANTHRACENIC OILS OF COAL TARS
Claude Ab der Halden, Nancy, France, assignor to Proabd S.A., Nancy, France, a French corporation
Filed Mar. 26, 1965, Ser. No. 442,889
Claims priority, application, France, Apr. 2, 1964, 969,476
14 Claims. (Cl. 260—318)

The present invention relates to a process for extracting anthracene and carbazol from crude anthracenic oils of coal tars.

The expression "crude anthracenic oils" is intended to mean heavy coal tar oils which distil between about 300 and 380° C. at atmospheric pressure and in which the anthracene and the carbazol are accompanied essentially by phenathrene.

In the conventional technique, this fraction of oils is subjected to a cold crystallization (15–20° C.) which gives rise to a paste (usually composed of 20% anthracene, 15–20% carbazol and 40% phenathrene, the rest being composed of retained oils and other various crystals) which is separated by filtration or centrifugation.

The paste is subsequently first treated with an aromatic solvent which dissolves principally the phenathrene (naphtha solvent, higher benzene homologs distilling at 130–180° C.) then with a pyridic solvent (heavy pyridine) which dissolves the carbazol. There is finally obtained 95% pure technical anthracene crystals. In view of all these successive dissolutions, the efficiency of the extraction of the anthracene is rather low, of the order of 30–50% at best.

The separation by stripping has also been proposed of, on one hand, the products distilling before the phenanthrene (boiling point 337° C.) and the anthracene (boiling point 340° C.) and, on the other, the heavy products with the carbazol (boiling point 355° C.).

There is thus obtained a binary phenathrene-anthracene fraction which, when treated with a solvent, provides the pure anthracene.

On the other hand, the crude carbazol obtained must also be treated with a solvent for the purification thereof. Other distillations are necessary in the process to recover the solvents to be recycled.

Finally, some known processes employ different selective solvents, for example, toluene and acetone combined and a distillation of the extracts obtained.

All these processes are long and complicated to carry out and the obtainment of anthracene and carbazol of high purity is delicate and costly.

The object of the present invention is to provide a process for extracting anthracene and carbazol from crude anthracenic oils with excellent efficiency in a simple way, said process producing anthracene and carbazol of high purity.

In the process according to the invention, a solvent which, in the neighborhood of room temperature, is a solvent of phenanthrene but which practically does not dissolve the anthracene and the carbazol, is added to the liquid anthracenic oil, the solution obtained is cooled so as to precipitate the anthracene and the carbazol, and the mixture of anthracene and carbazol thus obtained is collected and subjected to a single stripping which separates the anthracene from the carbazol.

Further features and advantages of the invention will appear from the ensuing description.

In the accompanying drawing, the figure is a diagram of an installation for continuously carrying out the process according to the invention.

The process of the invention is based on the discovery that if the binary anthracene carbazol mixture is isolated from the other constituents of the crude anthracenic oils, a simple stripping permits obtaining the anthracene and carbazol in a state which is as pure as is desired.

Now, all the bodies which accompany this binary mixture in the crude anthracenic oils are very soluble both in the clear anthracenic oils and in the aromatic solvents, whereas the anthracene and the carbazol are much less soluble.

When the crude anthracenic oils are crystallized alone, the separated crystals are rich in anthracene and carbazol but a part of the phenathrene also crystallizes since the clear oils are in an amount which is insufficient to dissolve all the phenanthrene present (50% of clear oils for 30% of phenathrene).

"Clear anthracenic oils" is intended to mean the crude oils of the considered fraction after separation of the anthracene, the carbazol and the phenathrene.

On the other hand, if in accordance with the invention there is added to the crude liquid anthracenic oil (which is consequently at a temperature higher than 80° C. and preferably between 80° and 120° C.) a sufficient amount of a solvent which, in the neighborhood of room temperature, namely below about 25° C., is a solvent of the phenathrene but does not dissolve the anthracene and the carbazol, all the phenathrene remains in solution when cooling to a temperature lower than 25° C. and preferably between 15° and 20° C., and crystals of an anthracene-carbazol mixture precipitate which can be thereafter separated into its pure constituents by a single stripping operation.

Among the solvents of utility in the process according to the invention there will be mentioned more particularly the aromatic hydrocarbons, such as the higher benzene homologs, toluene xylene etc., and the naphtha solvent. The use of benzene is practically impossible owing to its excessively low boiling point (lower than the low limit temperature for maintaining the crude anthracenic oils in the liquid state).

Also employable as a solvent is the distillation fraction of coal tars which distils between about 140° and 180° C., and is dephenolated and depyridinated.

The amount of solvent to mix with the crude anthracenic oil depends on the nature of the solvent employed. It is advantageously between 70 and 100% of the weight of the crude oil and advantageously of the order of 80% of the weight of the crude anthracenic oil.

In practice, occluded oils in the crystals after the crystallization always remain. In this care, there is preferably performed a successive extraction of these oils by cold washing with a solvent.

Further, in order to reduce the total amount of solvent to be employed (and thus reduce the loss of anthracene and carbazol by dissolution), the precipitation is advantageously carried out in two stages of successive crystallizations, always recycling the solvent which becomes successively charged with phenathrene and is always saturated with a binary anthracene-carbazol mixture. Finally, owing to the presence of the solvent, the crystals formed which correspond to only 10–50% of the mass, decant very well from the mother solution and are easily separated in suspension in a certain amount of liquid (for example 40% of crystals, 60% of mother solution) without mechanical apparatus.

In the ultimate decantation, the solvent mixed with the crystals and still contaminated with some impurities, is well diluted with pure solvent so that the suspension of crystals can then be pumped to the final stripping column and afford in the latter the anthracene and the carbazol at the desired degree of purity.

With reference to the accompanying drawing, it can be seen that the crude liquid anthracenic oils are supplied through a pipe 1 and are mixed with used solvent IV which already contains impurities and is supplied through a pipe 2 leading from a subsequent decantation stage of the installation. The mixture comprising the crude oils and solvent is cooled in a crystallizer 3 employing stirring means. The slurry formed is piped by a pipe 3a to a static decantation apparatus 4 which comprises a self-cleaning filter of conventional type for the extraction of the liquid. A suspension of crystals in the liquid passes through a pipe 4a into a mixer 6 which also receives through a pipe 7 used solvent III from a subsequent decantation stage. The new slurry obtained is decanted in an apparatus 8 identical to the apparatus 4 and separated into a liquid which constitutes the used solvent IV employed at the start of the process and a concentrated suspension which is supplied through a pipe 8a to a second mixer 9 receiving a used solvent II from a subsequent decantation stage through a pipe 10.

A decanter 11, identical to the aforementioned decanters, receives the slurry from the mixer 9 and separates a liquid constituting the solvent III and a suspension of the purified crystals. This suspension is piped by a pipe 11a to a melting chamber 12 supplied through a pipe 13 with used solvent I which is almost pure and comes from a subsequent decantation stage. In this melting chamber the crystals are dissolved and the solution obtained is piped to a stirring crystallizer 14 in which, by cooling, crystals are obtained which are piped by a pipe 14a to a decanter 15 where are separated a liquid forming the aforementioned solvent II and a suspension which is mixed in a mixer 16 with the pure solvent supplied to the installation through a pipe 17. An ultimate decantation in a decanter 18 permits obtaining practically pure crystals in suspension in a solvent and separating a liquid which is hardly contaminated and constitutes the aforementioned solvent I.

The suspension is pumped from the decanter 18 through a pipe 19 to a stripping column 20.

The column 20 operates under low pressure. The solvent, which constitutes the reflux at the top end of the column, is extracted through a pipe 21, the pure anthracene is extracted at 22; the carbazol is drawn off at 23 at the base of the column and the heating of the latter is effected by a circulation of liquid from the base of the column by a pump 24 through a conventional heater 25 (directly or indirectly heated).

The solvent mixed with oils issuing from the decanter 4 is piped through a pipe 5 to a column 26 which separates the regenerated solvent at the top end of the column at 27 and a mixture of phenanthrene, impurities and small residual amounts of anthracene and carbazol at the base of the column at 28. The column 26 can operate under atmospheric pressure. It is heated by circulation, by means of a pump 29, of the oils from the base of the column through a conventional heater 30.

There will now be given by way of example by which the invention is not intended to be limited, a manner of carrying out the process according to the invention in the installation shown in the figure and described hereinbefore. In this example, the process of the invention is carried out in a continuous manner, which is the preferred manner of carrying out the invention, but it must be understood that the process can be carried out in a discontinuous manner, if desired, by modifying the installation accordingly.

EXAMPLE

There is introduced at 1 in a continuous manner a crude oil containing 10% of anthracene A, 4% of carbazol C and 86% of impurities P, 30% of which is phenanthrene. It is mixed at 100° C. with 80% of its weight of a used solvent IV coming from the decanter 8 and consisting of naphtha solvent (B.P. 95% between 140° and 170° C.) containing 1.2% of A, 0.75% of C and 17% of P. The solution is cooled to 20° C. in the crystallizer 3 where the amount of crystals formed is 10–15% of the mixture by weight. In the decanter 4 a liquid is separated and piped to the column 26 recovering the solvent, the liquid containing, in addition to the solvent, 1.2% of A, 0.7% of C and 56% of P and a suspension comprising 40% of crystals and 60% of liquid and having the following composition: 25% of A, 9% of C, 43% of P, the rest being a solvent. This suspension is mixed cold at 6 with the solvent III which contains 1.2% of A, 0.7% of C and 5.1% of P, it is decanted at 8 into, on one hand, the aforementioned solvent IV and, on the other, a suspension of crystals whose composition is: 27% of A, 10% of C, 15% of P, the rest being a solvent.

This suspension is washed cold in the mixer 9 by the used solvent II from the decanter 15 and whose composition is as follows: 1.2% of A, 0.7% of C, 2.7% of P, the rest being a naphtha solvent. It is thereafter separated in the decanter 11 into the aforementioned solvent III and a suspension whose composition is 27% of A, 10% of C, 7% of P, the rest being a solvent.

The latter is mixed at 100° C. in the melting chamber 12 with used solvent I from the decanter 18 having the following composition: 1.2% of A, 0.7% of C, 0.46% of P, the rest being a naphtha solvent. When all the crystals have been dissolved, the solution is piped to a crystallizer 14 where it is cooled to 20° C. The slurry is thereafter decanted at 15 into the aforementioned solvent II and into a suspension containing 30% of A, 12% of C, 1.6% of P, the rest being a solvent which is piped to the mixer 16 where it is washed cold by the pure naphtha solvent entering through the pipe 17 (about 80% of pure solvent relative to the weight of the treated crude anthracenic oils).

The last decantation is carried out at 18 and this provides the aforementioned solvent I and a pumpable slurry which contains 31% of A, 11% of C, 0.4% of P, the rest being a solvent, and which is piped to the stripping column 20.

The column operates under an absolute pressure of about 100 mm. of Hg. It comprises sixty trays and the pure solvent is extracted at 21 in such amount that the temperature in the fourth tray from the top of the column remains constant at 250° C. The anthracene is extracted at 22, eight trays below the top of the column and twenty trays above the supply, and its purity exceeds 95%.

The heating of the base of the column is such that the reflux ratio at the top end of the latter is 6/1 relative to the withdrawal of the anthracene. The carbazol is withdrawn at 23 and the number of extracting trays below the supply is 32. The carbazol is extracted in a continuous manner in the same way as the anthracene and has a purity exceeding 95%.

The solvent leaving the decanter 4 through the pipe 5 is treated in the stripping column 26 which has twenty trays (ten above and ten below the supply). It operates at atmospheric pressure and supplies, at 27, at pure solvent, a residue containing 2% of A, 1% of C and 97% of P, 34% of which is phenanthrene.

The yields of the process, as concerns carbazol and anthracene having a purity exceeding 95%, exceed 80% in the foregoing example. These yields obviously depend on the concentrations of these bodies in the crude anthracenic oils treated.

It is clear that the invention provides a process for separating carbazol and anthracene having a purity exceeding 95% from crude anthracenic oils of coal tar with maximum yield, without employing the usual costly and delicate apparatus, filtering under a vacuum or by centrifugation, by means of a single cheap solvent in an operation which can be entirely continuous, merely a single final stripping being necessary for collecting these two compounds separately.

Although a specific example of the invention has been described it must be understood that the invention is not limited thereby but defined by the appended claims.

Having now described my invention what I claim as new and desire to secure by Letters Patent is:

1. Process for recovering anthracene and carbazol from crude anthracenic oils of coal tar, comprising adding to the liquid anthracenic oil a selective solvent for phenanthrene selected from the group consisting of aromatic hydrocarbons and dephenolated and depyridinated distillation fractions of coal tars distilling between about 140 and 180° C., cooling the resulting solution to precipitate a mixture of anthracene and carbazol therefrom, collecting the precipitated anthracene-carbazol mixture thus obtained and subjecting said mixture to a single distillation step for separating the anthracene from the carbazol.

2. Process as claimed in claim 1, wherein the precipitation of the anthracene-carbazol mixture is effected in two steps separated by a plurality of washing steps at low temperature with said solvent followed by a step of redissolving the mixture at high temperature in said solvent before the second precipitation step.

3. Process as claimed in claim 2, wherein pure solvent is added to a suspension of the anthracene-carbazol mixture collected from the second precipitation step, and is used successively in said washing steps in the direction of the first precipitation step, the impure solvent coming from the first of said washing steps being added to the liquid anthracenic oil as said solvent for the phenanthrene and the solvent which contains phenanthrene and impurities being collected after said first precipitation step by decantation from said anthracene-carbazol mixture.

4. Process as claimed in claim 1, wherein the precipitated anthracene-carbazol mixture is collected by decantation of the mother solutions.

5. Process as claimed in claim 1, wherein said anthracene-carbazol mixture is washed with said solvent at low temperature before said distillation step.

6. Process as claimed in claim 1, wherein the anthracene-carbazol mixture is piped to said distillation step in the form of a slurry in said solvent.

7. Process as claimed in claim 1, wherein said distillation step is effected under reduced pressure.

8. Process as claimed in claim 1, wherein said solvent is an aromatic hydrocarbon boiling higher than benzene and is selected from the group consisting of toluene, a xylene, and a naphtha solvent.

9. Process as claimed in claim 1, wherein said solvent is mixed with the anthracenic oil at a temperature in the range of 80° C.–120° C.

10. Process as claimed in claim 1, wherein the amount of solvent added to the anthracenic oil is 70–100% of the weight of the latter.

11. Process as claimed in claim 1, wherein the precipitation of the anthracene-carbazol mixture is effected at a temperature below 25° C.

12. In a process for recovering anthracene and carbazol from crude anthracenic oils of coal tar comprising a selective extraction of phenanthrene by means of a solvent therefor and a subsequent separation of anthracene from carbazol, the improvement which comprises effecting said separation by subjecting the anthracene-carbazol residue from said extraction to a single distillation step and collecting separately anthracene and carbazol from said distillation step.

13. The process of claim 12, wherein said anthracene-carbazol residue is sent to said distillation step in the form of a slurry in said solvent, and the solvent is collected separately from said distillation step.

14. The process of claim 12, wherein said distillation step is effected under reduced pressure.

References Cited

UNITED STATES PATENTS 2,764,595    9/1956    De Jong _____ 260—318

WALTER A. MODANCE, *Primary Examiner.*

JOHN D. RANDOLPH, *Examiner.*

J. M. FORD, *Assistant Examiner.*